Patented Nov. 16, 1943 2,334,636

UNITED STATES PATENT OFFICE 2,334,636

SYPHILIS TEST AND ANTIGEN

Louis Y. Mazzini, Indianapolis, Ind., assignor to Indiana University Foundation, Bloomington, Ind., a corporation of Indiana No Drawing. Application August 17, 1939, Serial No. 290,671

10 Claims. (Cl. 167—78)

This invention relates to a reliable, sensitive, simple and rapid test for the presence of the syphilitic reagin.

No claim is made that the test is 100% sensitive or 100% specific.

As a screen or preliminary test, it is especially valuable. Of the many tests such as the Kline, Kahn and Wassermann, it will first indicate the presence of the syphilitic reagin in the testee's blood. Also in patient's under treatment it will be the last of the several different companion tests to register the absence of the reagin in the testee's blood. This indicates not only the wide range but also the comparative sensitivity of this test. From the foregoing it is not to be assumed that the test always registers the presence of the reagin for cases known never to have been subjected to the infection. A negative result is obtained in these instances. Infected patients, after adequate treatment, and upon test register negative. The foregoing statements are made based upon results of thousands of comparison tests.

This invention is primarily directed to a flocculation type test, now well accepted as a satisfactory test for the presence of the syphilitic reagin.

The chief feature of the invention is the antigen, the fundamental basis for the present flocculation test, its preparation, titration and use.

Another chief feature of the invention is the specific procedure employed. In this connection it is to be observed that in the flocculation test if the antigen, or ripened antigen of the present invention be used in the Kline test procedure, or the Kline antigen be used in the present invention procedure no satisfactory result in either event can be obtained. Thus, the dissimilarity between procedures and antigens is demonstrated conclusively. This explanation is inserted by way of caution.

Another feature of the present invention consists in forming on a glass plate a series of rings similar to those used in the Kline procedure. Since instrument and technic for ring formation are well known in the serology art, no drawing thereof is illustrated or further reference will be had thereto, except as the same is necessary in the subsequent procedure disclosure and it is sufficient to here set forth that the ring forming material is melted sealing wax, applied to the glass slide, which has been cleansed and made fat free, and by dipping the instrument in said wax and depositing the material therefrom in the form of a ring upon the glass surface. One or more superposed applications will result in the production of chambers of sufficient depth having hardened walls. The life of such slides, if unbroken, is without known limit. This property, the reuse of these slides, materially reduces the time element when large scale testing is necessary.

For a complete understanding of the flocculation type invention, the following description will cover in order, the preparation of the antigen, the titration thereof, preparation of patient's serum and then the test proper.

Reagents

*Preparation of antigen extract*

20 grams of dehydrated beef powder, 10 grams powdered egg yolk, and 200 cc. of ether are placed in a 500 cc. wide mouth glass stoppered bottle. The mixture is shaken. If the shaking is in a mechanical shaker, the time is 5 minutes and if by hand the shaking is for 15 minutes. The material then is filtered through a 24 cm. paper filter (Schleicher & Schull #597) into a 500 cc. flask. The ether extraction is repeated four additional times, using 100 cc. of ether each time and using a new filter paper for each filtration. Then all the ethereal filtrations are collected and placed in a 500 cc. flask for subsequent use. After the last extraction is completed, the moist powder is spread on a new piece of filter paper and dried as by placing the same in an incubator and subjecting it to a temperature of approximately 37° C. for about 15 minutes. This removes the ether adhering to the powder.

This dry powder then is placed in a 500 cc. glass stoppered bottle and to the same is added 80 cc. of absolute alcohol. The mixture then is shaken in a mechanical shaker for four hours. If desired, the mixture may be left at room temperature for a sufficiently long interval such as three days, and during that interval being subjected to occasional shaking as, for example, three times daily, and for 5 minutes for each shaking. The resultant mixture then is filtered through a 24 cm. paper as above identified, and into a 100 cc. wide mouth glass stoppered bottle. The powder residue then is discarded.

The combined ethereal filtrations, previously described, are subjected to evaporation by being placed in a large evaporating dish and subjecting the dish to heat from a water bath at 55° C. This forms a concentrated ether extract which then is poured rapidly into an evaporating dish containing acetone, previously warmed, to the same temperature. The acetone then immediately is decanted into two 50 cc. centrifuge tubes and centrifuged at about 2,000 R. P. M. for 5 minutes. The acetone is poured off and discarded. The acetone insoluble lipoids resulting from the aforesaid, are collected from the tubes with a spatula and added to the alcoholic extract, previously mentioned. This then is placed in a bottle and held at 55° C. in a water bath for about 30 minutes, shaking at frequent intervals. The extract then is allowed to cool and one way is to place the bottle in a refrigerator for 30 minutes. The liquid then is filtered through a 12.5 cm. paper (Whatman #40)

and the resulting filtered liquid is the stock antigen or concentrate antigen. It has a pale yellow color.

If any precipitate appears after the extract or concentrate has stood for some time, the precipitate should be removed by additional filtration. The antigen concentrate is kept at room temperature. The antigen concentrate is now ready for titration and reference thereto will be had hereinafter.

In order to obtain an extract or stock antigen which is more uniform than that previously described and wherein the yield is approximately 50% greater per operation or batch production, the following procedure as briefly outlined may be followed:

The ethereal extracts before mentioned are obtained and concentrated as previously described. The concentrated extract is added to the acetone and the mixture is handled as previously described, resulting in an acetone insoluble fraction. This insoluble fraction then is added to 50 cc. of absolute alcohol and is warmed to about 55° for about 15 minutes. This alcoholic mixture is refrigerated for about ½ hour at 6° to 8° C. It then is filtered and the solids residue is discarded. The liquid is evaporated to dryness. This evaporation residue represents the acetone insoluble alcohol soluble fraction of the original material. This latter fraction then is added to the alcoholic fraction obtained as described in the procedure of the preparation of the antigen by the first method. The amount of alcohol added to the powder resulting from ethereal extraction and evaporation in this instance, however, is increased from 80 cc. to 100 cc. This represents the stock antigen which results in approximately 50% greater yield and the yield having, as stated, more constant characteristics.

In the following description, the term "stock antigen" refers to the final product previously described as the result of either procedure described.

Cholesterinized Alcohol 500 mg. C. P. cholesterin (Pfanstiehl) and 50 cc. of absolute ethyl alcohol are placed in a 100 cc. glass stoppered bottle and the bottle is heated in a water bath at 55° C. for about 30 minutes or until the cholesterin has completely dissolved, the heating being accompanied by shaking at frequent intervals. The solution then is filtered. This constitutes the cholesterinized alcohol.

Saline Buffer Solution

A buffer saline solution having a hydrogen ion concentration of 6.3 to 6.4 and a salt concentration of 10 grams per liter, is prepared. The ingredients of this solution include the following:

| | | |
|---|---|---|
| Sodium chloride | gm | 2.025 |
| Secondary sodium phosphate ($Na_2HPO_4$) | hm | 0.425 |
| Primary potassium phosphate ($KH_2PO_4$) | gm | 0.050 |
| Double distiller water | cc | 250.00 |
| N/1 hydrochloric acid | cc | 0.8 |
| Formaldehyde (Merck's reagent) | cc | 0.25 |

The resulting saline solution is filtered and kept in a glass stoppered bottle. Generally, it is not necessary to prepare it more than once a month. It is, however, to be noted that as often as a sediment appears, the solution is to be filtered because particles of dirt or other debris which may be transferred to this suspension, will subsequently appear in the field of vision during the reading of the flocculation test and unless differentiated from the specific flocculate of the test, may lead to a false reading or indication in the test.

Titration of the Antigen

Titration of any antigen is necessary and especially this antigen concentrate, previously described, because it is impossible to obtain extracts or concentrates of uniform antigenic value due to the fact that the initial materials may vary in specific constituents. Once the antigens have been titrated to the desired sensitivity, however, the routine for the preparation of the suspension is simple and readily effected.

Determination of the Optimum Lipoid-Cholesterin Ratio

In order to effect such determination, there is added 0.1 cc. of the stock antigen or antigen concentrate directly to the bottom of each of five clean and dry serological test tubes. To each of the five tubes there is added some of the 1% cholesterinized alcohol and it has been determined if 0.9 cc. be added to tube #1; 1.4 cc. to tube #2; 1.9 cc. to tube #3; 2.4 cc. to tube #4 and 2.9 cc. to tube #5, a sufficient gradation is provided. These tubes are corked and the contents thoroughly mixed. The resulting ratio in the respective tubes is 1:10; 1:15; 1:20; 1:25 and 1:30, and these ratios are applied as labels to bottles of a capacity between 20 to 30 cc. Into each of these five labeled bottles, there is added directly to the bottom, 3 cc. of the buffered saline solution, previously described.

With a 1 cc. pipette graduated to the tip measure, 0.4 cc. reading from the bottom of the pipette containing the 1 to 10 cholesterinized antigen, the following procedure is employed:

The 1:10 ratio labeled bottle is held in the left hand and a rapid rotating motion is imparted to it so that the buffered saline solution therein also is rotated. During this rotation, the antigen concentrate of the first test tube is discharged directly and at once into said saline solution from the pipette which is held in the right hand. The bottle then is corked and shaken for ten seconds and then is allowed to stand at room temperature without further manipulation. The resulting liquid is the antigen suspension of the 1:10 ratio designation.

In a similar manner, the 1:15, 1:20, 1:25 and 1:30 antigen suspensions are prepared.

These antigen suspensions are allowed to stand at room temperature from three to four hours. The reason for permitting standing for this period is to permit the antigen suspension to reach its optimum sensitivity, although it may be used in emergencies within 15 minutes after preparation, provided the bottle containing the freshly prepared suspension is placed in a refrigerator at 6° to 8° C. for 15 minutes. It is to be observed that with this short standing interval the suspension has a degree or stage of ripening that normally would be satisfactory although it may occasionally fail to react with weakly positive serum. For that reason, antigen ripened at room temperature for from three to four hours is preferred.

Trial of the Antigen Suspensions

At the end of three to four hours of ripening the suspensions #1 (ratio 1:10) is drawn up into a 5 cc. syringe fitted with a 25 ga. needle. There then are selected thirty or more sera from cases known to be free from syphilitic infection. Extreme care must be taken that no serum is included at this time which may contain even a few reacting units of reagin. 0.05 cc. of serum from each of the thirty negative specimens is placed into the corresponding thirty chambers on a suitable number of glass slides which have been previously placed in a slide holder. The preparation of such slides has been previously briefly set forth and will be set forth more fully hereinafter.

There then is discharged by exerting slight pressure on the piston of the syringe with the index finger, one drop of the 1:10 suspension and into each of the thirty sera on said slides. These slides are then rotated with a circular and slightly jerky motion for 4 minutes at the rate of 120 rotations per minute. It is important the number of the rotations and the character of the motion be followed so that the antigen suspension particles become well dispersed throughout the area of the rings. It is not necessary or desirable that the motion be of such a nature as to cause the sera to "jump" the rings.

Each of the thirty rings then is examined under the low power (16 m. m.) objective of the microscope and with subdued light. Every one of the rings should show numerous very small round or slightly elongated particles of lipoid-cholesterin complex. These particles generally are uniformly dispersed throughout the field of vision and should not show the slightest clumping.

A rather rough comparison of the wav the same should appear would be to take a sheet of white paper and tap the same with a sharpened pencil and the small black lead dottings on the paper represent a fair objective illustration of what should be seen in the field of vision. This is the type or example of the negative reaction.

The 1:15 suspension then is similarly followed through, using the same sera stock in the same order as previously used in the 1:10 suspension procedure. The 1:20, 1:25 and 1:30 suspension procedures are similarly followed through with.

It is to be observed the pipetting of the sera should be carried out as quickly as possible because evaporation thereof takes place rapidly due to the small volume used.

Usually within the range of 1:10 to 1:30 will be found one or more lipoid-cholesterin ratios in which the cholesterin is in excess of the lipoids, allowing the spontaneous clumping of the articles. Obviously, these ratios cannot be employed in the test proper hereinafter to be described, since false, positive reactions will be indicated as a result of the natural clumping of such suspensions in the negative sera.

Determination of the Antigenic Quality of the Suspension

Having thus determined the lipoid-cholesterin ratios which will not cause false positive reactions with negative sera, the next step in the standardization of the antigen is the evaluation of the antigenic properties of these suspensions, which have been found suitable as hereinafter noted. For this purpose, select at least ten partially positive sera, preferably those from long treated cases. The object of utilizing these sera is to provide as few reacting reagin units as possible.

0.05 cc. of the various sera stocks of partially positive specimens are placed in corresponding ten chambers on a glass slide. One drop of the 1:10 ratio suspension then is discharge into each ring in the manner previously described. This slide is similarly rotated for 4 minutes at 120 rotations per minute. The ten samples then are examined through the microscope in the same manner as previously described and the result recorded. The other ratios of the antigen suspensions which did not give false positive reactions—in other words, those which did give clear cut negative reactions with known negative sera, are then similarly tested. When the trials are conducted with sera containing relative few reacting units, it will be observed the lower the lipoid-cholesterin ratio is, the weaker the reaction—that is, the clumping action—and the flocculate increases in size as the ratio increases.

After recording all of the results and having made a study of them, a final lipoid-cholesterin ratio is selected, which is the titer of the antigen.

For maximum sensitivity, the suspension containing the highest lipoid-cholesterin ratio which does not cause the least or slightest clumping in the presence of negative sera, is selected as the titer. If a less sensitivity antigen suspension is desired, a lower ratio is chosen. Naturally, a greater degree of safety is obtained by using a lower ratio but the sensitivity usually will be decreased correspondingly.

When the titer of the antigen has been determined as above set forth, a sufficient amount of cholesterinized antigen is prepared to meet the individual needs for approximately one month. For example, if the titer finally selected is that of 1:20 ratio, then by taking 0.5 cc. of the stock antigen or antigen concentrate and adding 9.5 cc. of 1% cholesterinized alcohol, a supply of 1:20 ratio for about one month is obtained. 0.4 cc. of the cholesterinized antigen, regardless of the ratio of the same, is the fixed amount to use with 3 cc. of buffered saline solution in the actual test. This volume of 3.4 cc. will be sufficient for about 300 individual tests.

It would seem that the antigenic determination could be eliminated and the titer be based solely on the lipoid-cholesterin ratio. By this procedure less time and labor would be involved in the standardization of the antigen. However, actual experience has shown that this determination is very desirable if not essential. Sometimes it can be demonstrated that two different ratios give approximately the same degree of clumping with weakly positive sera, and while there is little choice between the two, the logical dilution to employ is the one having the lower ratio, because the sensitivity is the same while the margin of safety (specificity) is increased. Obviously if the antigenic determination had not been carried out the dilution of choice as determined by the lipoid-cholesterin ratio titration would be the higher of the two.

It is possible to eliminate all titrations and to set an arbitrary mean which past experience has shown is the average lipoid-cholesterin ratio. For instance, the most frequently encountered ratios which give clear-cut negative reactions with negative sera are the 1:10, 1:15, 1:20 and 1:25. Therefore, an arbitrary selection of the dilution containing the 1:15 or 1:20 ratios could be made provided strict adherence to details of technic is observed. It is believed, however, that both titrations are absolutely necessary if the highest sensitivity consistent with safety is to be obtained. It is also believed that in general the accuracy with which serologic reagents are standardized largely determined the quality of work performed in any laboratory irrespective of the merits of the technic involved.

*Preparation—Patient's serum*

The patient's serum is separated from the clot by centrifugalization and heated for 30 minutes in the water bath at 55° C. to 56° C. For emergency pretransfusion test the serum may be inactivated at 60° C. for 10 minutes. Inspection of sera for visible precipitate after heating should be done as a matter of routine. Occasionally heated serum contains a precipitate which, if not removed, may interfere with serologic reactions in general. There is not, however, the possibility that the precipitate, if left in the serum, will be mistaken for the true flocculate of a positive reaction when read microscopically, which does occur when specimens containing this pseudo-precipitate are read macroscopically.

THE TEST PROPER

Once the desired sensitivity of the antigen has been determined the daily routine technic for the preparation of the suspension is very simple and quickly done. The reagents for the test proper have been reduced to two solutions: buffered saline solution and cholesterinized antigen solution.

THE ROUTINE TECHNIQUE OF THE FLOCCULATION TEST

The routine technique is as follows:

Into a 20 cc. to 30 cc. capacity bottle there is placed directly into the bottom of said bottle 3 cc. of the buffered saline solution, which is colorless. With a pipette of the same character as previously described with reference to the titration and in a similar manner, the antigen concentrate is discharged directly and at once into the saline solution. The amount of antigen discharged is 0.4 cc. The bottle then is corked and shaken for 10 seconds, and then is allowed to stand at room temperature for from three to four hours, at which time, as previously stated, the suspension reaches its optimum sensitivity. In other words, the suspension is properly ripened and may then be used. It will remain satisfactory for use for a period of twenty-four hours after which time decreases in sensitivity. The ripened suspension, therefore, should for dependable results, be used within the twenty-four hour period last mentioned.

This ripened suspension has a milky appearance. The ripened suspension is then transferred to a glass syringe of the character previously described and the required number of glass slides with the required number of rings thereon is placed on a slide holder, depending upon the number of sera to be tested.

0.05 cc. of each patient's serum, which has been previously heated for 30 minutes at 55° to 56° C. is placed into one of the chambers on the slide. This serum, if in good condition and a good sample, is a straw colored liquid. If the specimen submitted has unduly aged, it will be dark color.

Into each of the rings containing the before mentioned amount of patient's serum, there is discharged one drop of the ripened antigen suspension. When the number of specimens to be tested is small, it is usually well to include known negative and known positive reacting sera as controls on the antigen.

The slide holder then is rotated for 4 minutes at 120 rotations per minute and in the manner previously described. It will be noted no incubation is required. After this rotation, the rings are macroscopically examined to make certain no serum has "jumped" the ring and contaminated another ring.

Each ring enclosed portion of the mixture of serum and ripened antigen then is examined microscopically under low power objective and with subdued light. Not only should the central portions of the ring be examined for evidence of reaction but the periphery of the chamber should be carefully examined as a routine practice for occasionally the clumps are very compact especially in a very positive sample and these have a tendency to locate in the outer portion of the ring. If there is no clumping, the result is recorded as negative. If the very small clumps appear, the recorded result is 1 plus; if slightly larger clumps appear, the recording is 2 plus; if medium, larger clumps appear, the recording is 3 plus; if very large clumps appear, the recording is 4 plus.

By way of explanation, a negative result is indicated by relatively minute and individual black dots, as it were. Positive results are indicated by clumping and may be said to closely resemble particles of matted fibre, such as felt, hair and the like, at least that is the appearance of the clump when viewed through the low power of a microscope.

An alternative method of reading may be as follows: When there is no clumping, the reading or test is negative. When the clumping is exceedingly small to very small clumps, the result is doubtful. When the clumping is of medium size to very large clumps, the reading or test is positive. In reading weakly, positive reactions, care should be taken to differentiate red blood cells or other debris which may be contained in the serum or on the slide or in the antigen suspension from the pure flocculate of a positive reaction. This caution obviously applies only in weakly, positive reactions since in strong positive reactions the debris or blood cells are masked by the large clumps of the reaction.

The reading of serological tests require judgment and experience for no accurate standard can be prepared, although no experience is needed to read strong positive reactions. Time, observation and experience alone will lead to the correct interpretation of weakly positive reactions.

It is to be noted the ripened suspension while milky in appearance, during its useable period, to-wit: twenty-four hours following preparation and after curing or ripening, does not show any marked separation in the milky liquid. It is, of course, to be understood, to obviate possible error, that a plurality of tests of each serum are made and if three tests are made and all three results agree, the agreed result is without question correct for that serum. If there be disagreement between the results for any given serum stock, the tests should be repeated, great care being exercised to observe all precautions so that the results will conform.

CARE OF THE SLIDES AFTER USE

The wax rings should not be removed from the glass slides after use. Immediately after reading the tests the slides are placed in a metal slide holder which is kept immersed in distilled water. By this procedure drying of sera on the slides is prevented. After the completion of the tests, the slides are scrubbed with a hand brush and soapy water; they are thoroughly rinsed in tap water and finally rinsed in distilled water. The slides are then transferred to a slide box and allowed to dry at room temperature under cover, or they may be dried by rubbing the chambers of the rings with a soft cloth free from lint. If proper care is given the slides, they may be used indefinitely.

SUMMARY

The foregoing flocculation test therefore, is broadly similar to the Kline flocculation test but is more sensitive and more specific. This test also differs from the Kline test in that in the Kline test four reagents are required whereas in this test but two reagents are required and, therefore, the chances of error introduction or contamination in the testing is in the present case reduced by one-half.

The explanation for the high degree of sensitivity and specificity may be found in the lipoid-cholesterin ratio; hydrogen ion concentration of the suspension, serum-antigen ratio, and the use of egg yolk.

The present test has an acknowledged sensitivity of 86.7%. This percentage is derived from an analysis of hundreds of tests upon sera from (*a*) treated primary syphilis (33.4%) (*b*) treated secondary syphilis (one case untreated) (66.7%) (*c*) treated congenital syphilis (one case untreated) (100%) (*d*) treated and untreated latent syphilis (94.6%) (*e*) treated and untreated tertiary syphilis (96%) and (*f*) treated and untreated neurosyphilis (90.5%), all of which tests of the present invention were checked against the following tests. Eagle C. F. (Wassermann), Eagle M. F. (micro-flocculation), Hinton F. (flocculation), Kahn Standard F. (flocculation), Kahn Presumptive F. (flocculation), Kline Diagnostic F. (flocculation), Kline Exclusion F. (flocculation) and Kolner C. F. (Wassermann).

In these comparisons under (*a*) only Hinton recorded a higher percentage, under (*b*) Hinton and the present invention were the highest and practically the same (difference 2%), under (*c*) three tests (not including the present invention) fell below 100%, under (*d*) (*e*) and (*f*) the present invention was as high in percentage or higher than any other test mentioned above.

The present test excludes or reduces prolonged incubation, or a combination of incubation and centrifugalization, uncertainty in obtaining uniformity of extracts and suspensions, and finally difficulty in reading the reaction. In addition, economy of time and materials as well as ease of preparing the reagents will be found to be important advantages of this invention.

The term "inactivated" used in connection with blood serum is intended to refer to a blood serum which has been heated to a sufficient degree for a sufficient interval so that the resulting product is in a proper condition for testing. This is empirical and has been disclosed as heating to 55° for 30 minutes or heating to 60° for 10 minutes. In complement fixation testing this inactivation destroys the complement. What result it has in flocculation testing is not known except that it appears to be essential. The term "empirical" is intended to refer to that antigen in that condition where it has optimum sensitivity.

While the invention has been described in great detail in the foregoing description and several modifications thereof have been set forth, the same is recited by way of example only and is to be considered as illustrative. These modifications, as well as others comparable or similar thereto which will readily suggest themselves to serologists and other persons skilled in this art, all are considered to be within the broad scope of the invention, reference being had to the appended claims.

The invention claimed is:

1. An antigen extract for flocculation testing for the presence of syphilitic reagin including the ether and alcohol soluble and acetone insoluble portions of a mixture of powdered beef heart and egg yolk prepared by repeatedly agitating and filtering said mixture with ether for repeated ethereal extraction, consolidating and concentrating the filtered liquids at about 55° C., subjecting the powder residue when ether free to alcoholic extraction by agitation and filtration, subjecting the ethereal concentrate to acetone extraction, mixing the alcoholic extract with the resulting ether soluble-acetone insoluble lipoids, and then heating, cooling and filtering this last mixture, the resulting clear, pale yellow liquid containing the ether insoluble-alcohol soluble lipoids and the ether soluble-acetone insoluble lipoids comprising the antigen extract.

2. An antigen extract as defined by claim 1 wherein the antigen yield is approximately 50% greater than the antigen yield obtained from the same amount of powdered material of claim 1, and wherein the ether soluble-acetone insoluble lipoids thereof are first subjected to alcoholic extraction and the resulting liquid evaporated to dryness, the resulting residue then being added to the original ether insoluble-alcohol soluble lipoids, the resulting mixture then being treated as the final mixture defined by claim 1 is so treated.

3. An antigen suspension for flocculation testing for the presence of syphilitic reagin which suspension is milky white in appearance and contains a mixture of the antigen extract as defined by claim 1, a cholesterinized alcohol and a sediment-free, buffer saline solution at least containing sodium chloride, secondary sodium phosphate, primary potassium phosphate and hydrochloric acid.

4. An antigen suspension for flocculation for the testing for the presence of syphilitic reagin which suspension is milky white in appearance and contains a mixture of the antigen extract as defined by claim 1 wherein the extract is further characterized by the ether soluble-acetone insoluble lipoids thereof are first subjected to alcoholic extraction and the resulting liquid evaporated to dryness, the resulting residue then being added to the original ether insoluble-alcoholic soluble lipoids of claim 1, the last mentioned resulting mixture then being treated as the final mixture defined by claim 1 is so treated, a cholesterinized alcohol and a sediment-free, buffer saline solution containing sodium chloride, secondary sodium phosphate, primary potassium phosphate, hydrochloric acid and formaldehyde.

5. A method of determining the optimum lipoid-cholesterin ratio of an antigen as defined by claim 1 for flocculation testing for syphilis including preparing a plurality of similar and ripened mixtures, each mixture containing an equal amount of lipoid containing antigen derived from animal material comprising a mixture of beef heart and egg yolk and which is ether insoluble-alcohol soluble and ether soluble-acetone insoluble, and a buffer saline solution, and a predetermined amount of cholesterinized alcohol, the amounts of the saline solution in the several mixtures being equal, the amount of alcohol in each mixture varying from that of other mixtures to form a substantially graduated series, then applying to each of a like number of known syphilis-free, heat inactivated blood serums a predetermined amount of the mixtures, each serum having associated therewith but one mixture, agitating the several sera-mixtures for the same interval until spontaneous clumping is obtained in at least one or more of the mixtures, and then examining the sera-mixtures under the low power of a microscope for clumping to determine the mixture or mixtures wherein the cholesterin is in excess of the lipoids, the clump free mixture having the highest amount of cholesterinized alcohol therein being the most sensitive for subsequent flocculation testing purposes.

6. A method of determining the flocculation antigenic quality of a lipoid-cholesterinized alcohol, saline buffered suspension, including determining the optimum lipoid-cholesterin ratio of an antigen as defined by claim 1 for flocculation testing for syphilis including preparing a plurality of similar and ripened mixtures, each mixture containing an equal amount of lipoid containing antigen derived from animal material comprising a mixture of beef heart and egg yolk and which is ether insoluble-alcohol soluble and ether soluble-acetone insoluble, and a buffer saline solution, and a predetermined amount of cholesterinized alcohol, the amount of the saline solution in the several mixtures being equal, the amount of alcohol in each mixture varying from that of other mixtures to form a substantially graduated series, then applying to each of a like number of known syphilis-free, heat inactivated blood serums a predetermined amount of the mixtures, each serum having associated therewith but one mixture, agitating the several sera-mixtures for the same interval until spontaneous clumping is obtained in at least one of the mixtures, and then examining the sera-mixtures under the low power of a microscope for clumping to determine the mixture or mixtures wherein the cholesterin is in excess of the lipoids, the clump free-mixture having the highest amount of cholesterinized alcohol therein being the most sensitive for subsequent flocculation testing purposes, then determining the cholesterin-lipoid mixtures wherein spontaneous clumping does not occur with known negative sera, then mixing with a like number of known sera having but little syphilitic reagin therein a predetermined amount of the last determined cholesterin-lipoid, non-clumping mixture, each serum having associated therewith but one of the mixtures, agitating the several last mentioned sera-mixtures for the same interval sufficient to obtain clumping in at least a plurality of sera-mixtures, and then examining under the low power of a microscope all last mentioned sera-mixtures for clumping, that cholesterin antigen mixture showing the greatest clumping being the most sensitive for subsequent flocculation testing, and that mixture of a plurality of mixtures showing substantially maximum clumping which contains the lower lipoid-cholesterin ratio being the safest for subsequent flocculation testing purposes.

7. A rapid screen slide type test for syphilis capable of completion within thirty minutes from drawing the blood sample including inactivating the serum thereof by heating for approximately ten minutes at about 60° C., forming an antigen suspension, the suspension including a cholesterinized alcohol, a saline buffer solution and an antigen as defined by claim 1, by dispersing the antigen particles in the buffering solution, the solution including sodium chloride, sodium phosphate, potassium phosphate and hydrochloric acid, such dispersion occurring by shaking for a very short interval, then allowing the foregoing to cool for approximately fifteen minutes at from 6 to 8° C., and then slide testing the inactivated serum with the resulting ripened mixture in the conventional slide flocculation test manner.

8. A rapid screen slide type test for syphilis including inactivating the blood sample serum by heating to at least 56° C., forming an antigen suspension, the suspension including a cholesterinized alcohol, a saline buffer solution and an antigen, as defined by claim 1, by dispersing the antigen particles in the buffering solution, the solution including sodium chloride, sodium phosphate, potassium phosphate and hydrochloric acid, such dispersion occurring by shaking for a short interval, then allowing the buffered suspension to stand and cool for ripening, and then slide testing the inactivated serum with the resulting ripened mixture in the conventional slide flocculation test manner, the lipoid-cholesterin ratio antigen utilized being determined by preparing a plurality of similar mixtures each latter mixture containing an equal amount of antigen as defined by claim 1, each latter mixture containing an equal amount of the aforesaid buffer solution, each latter mixture containing cholesterinized alcohol, the amount of alcohol in each mixture varying from that of the others to form a graduated series, applying to each latter mixture known syphilis-free, heat inactivated human blood serum, agitating the sera-mixtures for the same interval until spontaneous clumping is obtained in at least one of the mixtures, then examining same under the low power of microscope to determine the mixture or mixtures wherein the cholesterin is in excess of the lipoids, the clump-free mixture having the highest amount of cholesterinized alcohol therein being the most sensitive for subsequent flocculation test use.

9. A rapid screen slide type test for syphilis including inactivating the blood sample serum by heating to at least 56° C., forming an antigen suspension, the suspension including a cholesterinized alcohol, a saline buffer solution and an antigen, as defined by claim 1, by dispersing the antigen particles in the buffering solution, the solution including sodium chloride, sodium phosphate, potassium phosphate and hydrochloric acid, such dispersion occurring by shaking for a short interval, then allowing the buffered suspension to stand and cool for ripening, and then slide testing the inactivated serum with the resulting ripened mixture in the conventional slide flocculation test manner, the lipoid-cholesterin ratio antigen utilized being determined by preparing a plurality of similar mixtures each latter mixture containing an equal amount of antigen as defined by claim 1, each latter mixture containing an equal amount of the aforesaid buffer solution, each latter mixture containing cholesterinized alcohol, the amount of alcohol in each mixture varying from that of the others to form a graduated series, applying to each latter mixture known syphilis-free, heat inactivated human blood serum, agitating the sera-mixtures for the same interval until spontaneous clumping is obtained in at least one of the mixtures, then examining same under the low power of microscope to determine the mixture or mixtures wherein the cholesterin is in excess of the lipoids, the clump-free mixture having the highest amount of cholesterinized alcohol therein being the most sensitive for subsequent flocculation test use, then determining the cholesterin-lipoid mixtures wherein spontaneous clumping does not occur with known negative sera, then mixing with a like number of known sera having but little syphilitic reagin therein a predetermined amount of the last determined cholesterin-lipoid, non-clumping mixture, each serum having associated therewith but one of the mixtures, agitating the several last mentioned sera-mixtures for the same interval sufficient to obtain clumping in at least a plurality of sera-mixtures, and then examining under the lower power of a microscope all last mentioned sera-mixtures for clumping, that cholesterin antigen mixture showing the greatest clumping being the most sensitive for subsequent flocculation testing, and that mixture of a plurality of mixtures showing substantially maximum clumping which contains the lower lipoid-cholesterin ratio being the safest for subsequent flocculation testing purposes.

10. An antigen extract for the flocculation testing for the presence of syphilitic reagin comprising a clear pale yellow liquid prepared by subjecting a mixture of powdered beef heart and egg yolk to ether, alcohol and acetone extractions to produce an extract containing only the ether insoluble-alcohol soluble and the ether soluble-acetone insoluble lipoids.

LOUIS Y. MAZZINI.